(12) United States Patent
Tashiro et al.

(10) Patent No.: US 7,920,444 B2
(45) Date of Patent: Apr. 5, 2011

(54) ASSEMBLING METHOD FOR OPTICAL SYSTEM OF OPTICAL PICK-UP

(75) Inventors: Yoshiyuki Tashiro, Kanagawa (JP); Koichi Maruyama, Tokyo (JP); Toshihiro Tanaka, Saitama (JP)

(73) Assignee: Hoya Corporation, Tokyo (JP)

( * ) Notice: Subject to any disclaimer, the term of this patent is extended or adjusted under 35 U.S.C. 154(b) by 432 days.

(21) Appl. No.: 12/117,202

(22) Filed: May 8, 2008

(65) Prior Publication Data
US 2008/0279057 A1 Nov. 13, 2008

(30) Foreign Application Priority Data

May 10, 2007 (JP) ................................ 2007-125895

(51) Int. Cl.
*G11B 7/00* (2006.01)
(52) U.S. Cl. ............. 369/44.23; 369/44.32; 369/112.01; 369/112.23
(58) Field of Classification Search ............. 369/112.23, 369/112.24, 44.23, 44.32, 112.01; 359/813; 250/201.5
See application file for complete search history.

(56) References Cited

U.S. PATENT DOCUMENTS

| | | | |
|---|---|---|---|
| 5,317,144 A * | 5/1994 | Oono et al. ................. 250/201.5 |
| 5,689,378 A * | 11/1997 | Takashima et al. .......... 359/813 |
| 5,872,760 A * | 2/1999 | Kim et al. ................ 369/112.24 |
| 6,496,453 B2 * | 12/2002 | Asada et al. ............... 369/44.23 |
| 6,567,354 B2 * | 5/2003 | Yanagawa ................. 369/44.23 |
| 6,781,945 B2 * | 8/2004 | Ogata ...................... 369/112.23 |
| 7,151,737 B2 * | 12/2006 | Ogata ...................... 369/112.23 |
| 2001/0028625 A1 * | 10/2001 | Asada et al. ............. 369/112.24 |
| 2002/0060973 A1 * | 5/2002 | Yamanouchi et al. .... 369/112.23 |
| 2003/0156334 A1 | 8/2003 | Maruyama |
| 2004/0208110 A1 * | 10/2004 | Kimura et al. ........... 369/112.26 |
| 2005/0002289 A1 * | 1/2005 | Mori ......................... 369/44.23 |
| 2005/0078593 A1 | 4/2005 | Maruyama et al. |
| 2005/0157624 A1 | 7/2005 | Koreeda et al. |
| 2005/0180292 A1 * | 8/2005 | Nagashima ............. 369/112.01 |
| 2005/0276207 A1 * | 12/2005 | Oka et al. ................ 369/112.23 |
| 2006/0028932 A1 * | 2/2006 | Nakamura et al. ........ 369/44.23 |
| 2006/0077790 A1 * | 4/2006 | Noguchi .................. 369/44.23 |
| 2006/0181978 A1 | 8/2006 | Koreeda et al. |
| 2007/0014210 A1 * | 1/2007 | Nishioka ................... 369/44.32 |
| 2008/0074976 A1 | 3/2008 | Nishikawa et al. |

FOREIGN PATENT DOCUMENTS

JP 2004-342145 12/2004

* cited by examiner

*Primary Examiner* — Thuy N Pardo
(74) *Attorney, Agent, or Firm* — Greenblum & Bernstein, P.L.C.

(57) ABSTRACT

There is provided an assembling method for expanding a maximum admissible astigmatism of objective lens which includes defining a maximum admissible astigmatism for the entire optical system, installing the collimator lens on the optical system to cause a predetermined amount of astigmatism lying within a range of up to the maximum admissible astigmatism by tilting the collimator lens from a condition where a point source of the semiconductor laser lies on an optical axis of the collimator lens, and installing the objective lens on the body case of the optical system to bring a total amount of astigmatism of the entire optical system to a level smaller than or equal to the maximum admissible astigmatism for the entire optical system by rotating the objective lens from a condition where the point source of the semiconductor laser and the center of the collimator lens lie on the optical axis of the objective lens.

18 Claims, 3 Drawing Sheets

| ASTIGMATISM OF FRONT SIDE OPTICAL SYSTEM | ASTIGMATISM OF OBJECTIVE LENS | ASTIGMATISM OF OPTICAL SYSTEM OF OPTICAL PICK-UP |
|---|---|---|
| O | O | O |
| O | A | A |
| A | O | A |
| A | 0.5A | 0.5A |
| A | A | O |
| A | 1.5A | 0.5A |
| A | 2A | A |
| A | 2.5A | 1.5A |

ASSEMBLING METHOD FOR OPTICAL SYSTEM OF OPTICAL PICK-UP

BACKGROUND OF THE INVENTION

The present invention relates to an assembling method for an optical system of an optical pick-up in which a semiconductor laser is employed.

In general, an optical system of an optical pick-up is configured to converge a laser beam emitted by a semiconductor laser on an optical disc. Since in general the semiconductor laser causes an astigmatism, the laser beam obtained by converging the laser beam emitted by the semiconductor laser through the optical system has an astigmatism.

More specifically, a shape of a beam spot formed on the optical disc by the optical system changes from a circular shape state to an elliptical shape state depending on a defocus state of the laser beam on the optical disc, which raises a problem, such as deterioration of an RF signal or a jitter property. For this reason, the optical system is required to decrease the astigmatism.

Japanese Patent Provisional Publication No. 2004-342145A (hereafter, referred to as JP2004-342145A) discloses a technique for canceling an astigmatism caused in components in an optical system excepting a collimator lens with an astigmatism caused by the collimator lens. More specifically, the astigmatism caused in components in the optical system excepting the collimator lens is cancelled with the astigmatism caused by the collimator lens by adjusting the position of the collimator lens by rotating the collimator lens about an optical axis of the collimator lens. In this case, the collimator lens is required to be designed to have a certain astigmatism corresponding to the amount of the astigmatism that the optical system has. It is understood that since the amount of astigmatism varies from an optical system to another, a collimator lens designed for a certain optical system is not always suitable for other optical systems.

Recently, new technical standards, such as a BD (Blu-ray Disc) and a HD DVD, have been proposed. Based on the fact that the diameter of a beam spot is inversely proportional to a numerical aperture defined on an image side in an optical system (hereafter, frequently referred to as an image side numerical aperture) and is proportional to the wavelength of a beam, such a new technical standard is designed to decrease the beam spot diameter by increasing the image side numerical aperture of an optical system and decreasing the wavelength of a beam of a light source in the optical system.

On the other hand, the amount of astigmatism increases in proportion to the square of the image side numerical aperture. Therefore, if the image side numerical aperture of an objective lens in the optical pick-up is increased, the entire astigmatism caused in the optical system by a semiconductor laser or manufacturing errors increases.

In general, aberrations including an astigmatism caused in an optical system are evaluated in the unit of a wavelength. Considering that an evaluation wavelength for the new technical standard is approximately 405 nm which is shorter than that for the DVD (approximately 660 nm) and the CD (approximately 790 nm), the amount of aberration in the optical system according to the new technical standard increases in inverse proportion to the used wavelength even if an error in the shape of the objective lens in the optical system according to the new technical standard is substantially the same as that for the optical system for the DVD or CD.

By configuring an objective lens having a small amount of astigmatism, it may be possible to suppress the entire astigmatism in an optical system. However, it is considerably difficult to manufacture an objective lens of which astigmatism is very small even if the designed shape of the objective lens exhibits a small amount of astigmatism. In general, it is difficult to avoid an astigmatism due to a manufacturing error. In addition, the amount of astigmatism due to a manufacturing error varies from an objective lens to an objective lens.

In general, a maximum admissible astigmatism is determined for manufacturing of objective lenses. If the number of manufactured objective lenses not satisfying the maximum admissible astigmatism is relatively large (i.e., the yield is relatively low), a manufacturer is required to decrease the manufacturing error of each objective lens. However, to decrease the manufacturing error, the manufacturer needs to improve a production line, which also increases the cost for manufacturing objective lenses. For this reason, it is desirable for the manufacturer that the maximum admissible astigmatism is as large as possible so as to prevent the deterioration of the yield and the increase of the manufacturing cost.

SUMMARY OF THE INVENTION

The present invention is advantageous in that it provides an assembling method for an optical system of an optical pick-up capable of suppressing the total amount of astigmatism caused in the optical system while achieving a relatively large maximum admissible astigmatism for an objective lens.

According to an aspect of the invention, there is provided an assembling method for an optical system of an optical pick-up including a semiconductor laser, a collimator lens and an objective lens. The method includes defining a maximum admissible astigmatism for the entire optical system, installing, on a rear side of the semiconductor laser, the collimator lens on a body case of the optical system to cause a predetermined amount of astigmatism lying within a range of up to the maximum admissible astigmatism for the entire optical system by tilting the collimator lens with respect to a center of the collimator lens from a condition where a point source of the semiconductor laser lies on an optical axis of the collimator lens, and installing, on a rear side of the collimator lens, the objective lens on the body case of the optical system to bring a total amount of astigmatism of the entire optical system to a level smaller than or equal to the maximum admissible astigmatism for the entire optical system by rotating the objective lens about an optical axis of the objective lens under a condition where the point source of the semiconductor laser and the center of the collimator lens lie on the optical axis of the objective lens.

Such a configuration makes it possible to reduce the total amount of astigmatism of the entire optical system to a level smaller than or equal to the maximum admissible astigmatism while allowing the objective lens to have a maximum admissible astigmatism of up to a double value of the maximum admissible astigmatism of the entire optical system.

Consequently, it becomes possible to suppress the total amount of astigmatism of the entire optical system to a sufficiently low level while achieving a relatively large amount of maximum admissible astigmatism for the objective lens.

In at least one aspect, the predetermined amount of astigmatism caused by tilting the collimator lens is equal to the maximum admissible astigmatism for the entire optical system.

In at least one aspect, the maximum admissible astigmatism for the entire optical system lies within a range from 0.005 to 0.030 $\lambda$rms.

In at least one aspect, the maximum admissible astigmatism for the entire optical system lies within a range from 0.005 to 0.015 $\lambda$rms.

In at least one aspect, a wavelength of a beam of the semiconductor laser is shorter than or equal to 450 nm, and a numerical aperture defined for the objective lens on a image side is larger than or equal to 0.65.

BRIEF DESCRIPTION OF THE
ACCOMPANYING DRAWINGS

DETAILED DESCRIPTION OF THE
EMBODIMENTS

Hereinafter, an embodiment according to the invention is described with reference to the accompanying drawings.

Figure 1:
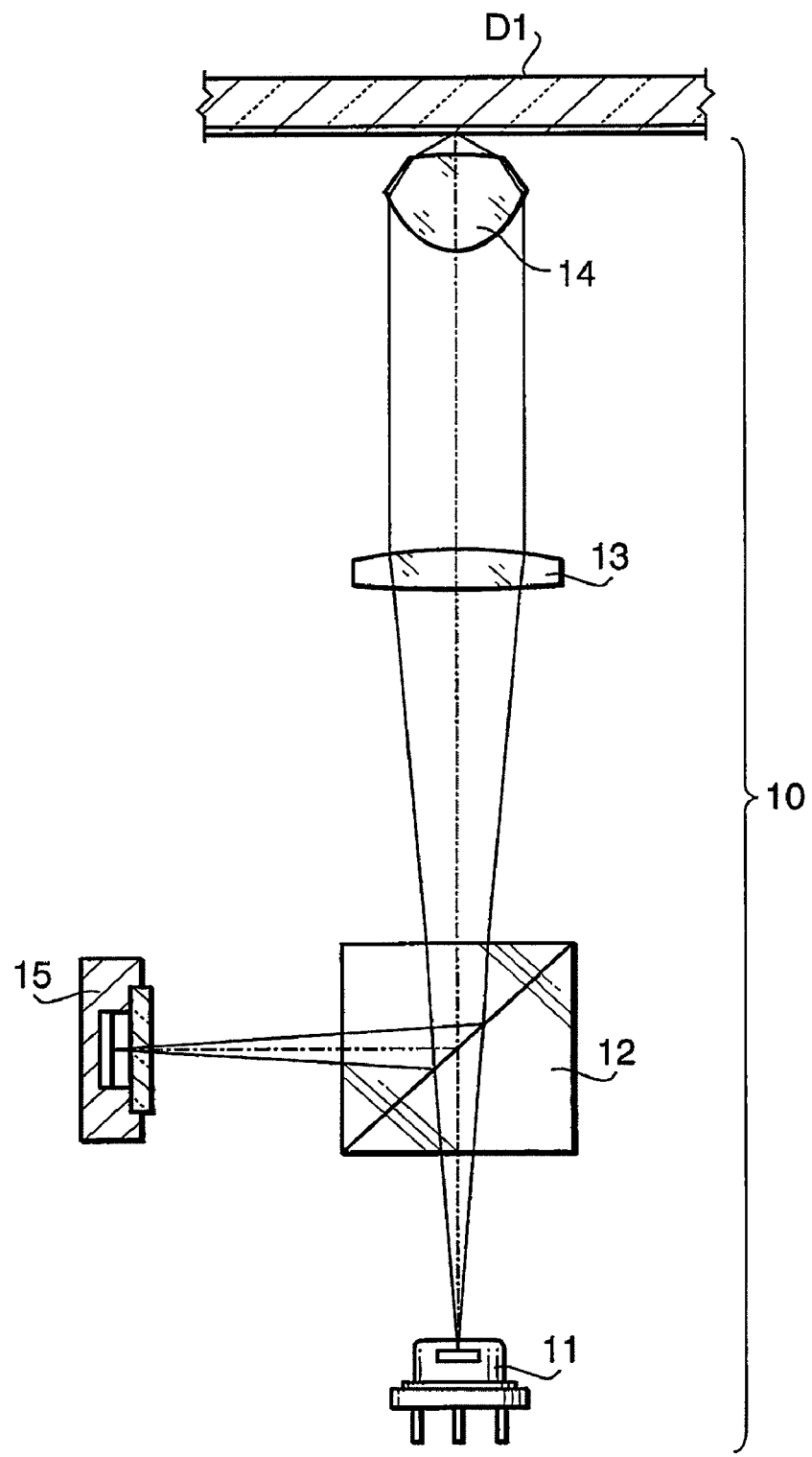
FIG. 1 is a block diagram of an optical system of an optical pick-up to which an assembling method according to an embodiment of the invention is applied.

FIG. 1 is a block diagram of an optical system 10 of an optical pick-up to which an assembling method according to an embodiment of the invention is applied. As shown in FIG. 1, the optical system 10 includes a semiconductor laser 11, a half mirror 12, a collimator lens 13, an objective lens 14, and a photoreceptor 15. The semiconductor laser 11 is configured to emit a light beam from a point source. The half mirror 12 has a function of passing a beam entering the half mirror 12 from a side and reflecting a beam entering the half mirror 12 from another side.

The collimator lens 13 converts the light beam which passed through the half mirror 12 into a substantially collimated beam. The objective lens 14 converges the collimated beam to form a beam spot on a record surface of an optical disc D1. The photoreceptor 15 detects light incident thereon after reflecting from the record surface of the optical disc D1, passing through the objective lens 14 and the collimator lens 13 in this order and then being reflected by the half mirror 12 toward the photoreceptor 15.

The objective lens 14 is mounted on an actuator in a body case of the optical pick-up (not shown) so that the objective lens 14 can be moved in a radial direction (i.e., a tracking direction) of the optical disc D1 and in a direction (i.e., a focusing direction) perpendicular to a surface of the optical disc D1. With this structure, the position of the objective lens 14 can be adjusted so that a beam spot having a suitable size is formed at a desired position on the record surface of the optical disc D1.

Figures 2, 3:
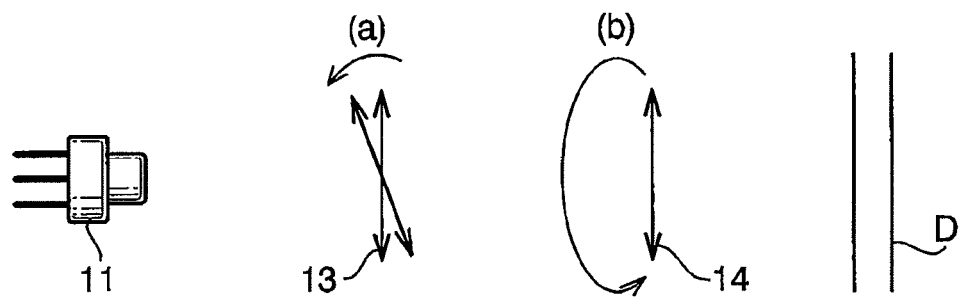
FIG. 2 is an explanatory illustration explaining the assembling method according to the embodiment.
FIG. 3 is a table showing a relationship between the astigmatism of a front side optical system, the astigmatism of an objective lens, and the total astigmatism of the entire optical system.
Figure 4:
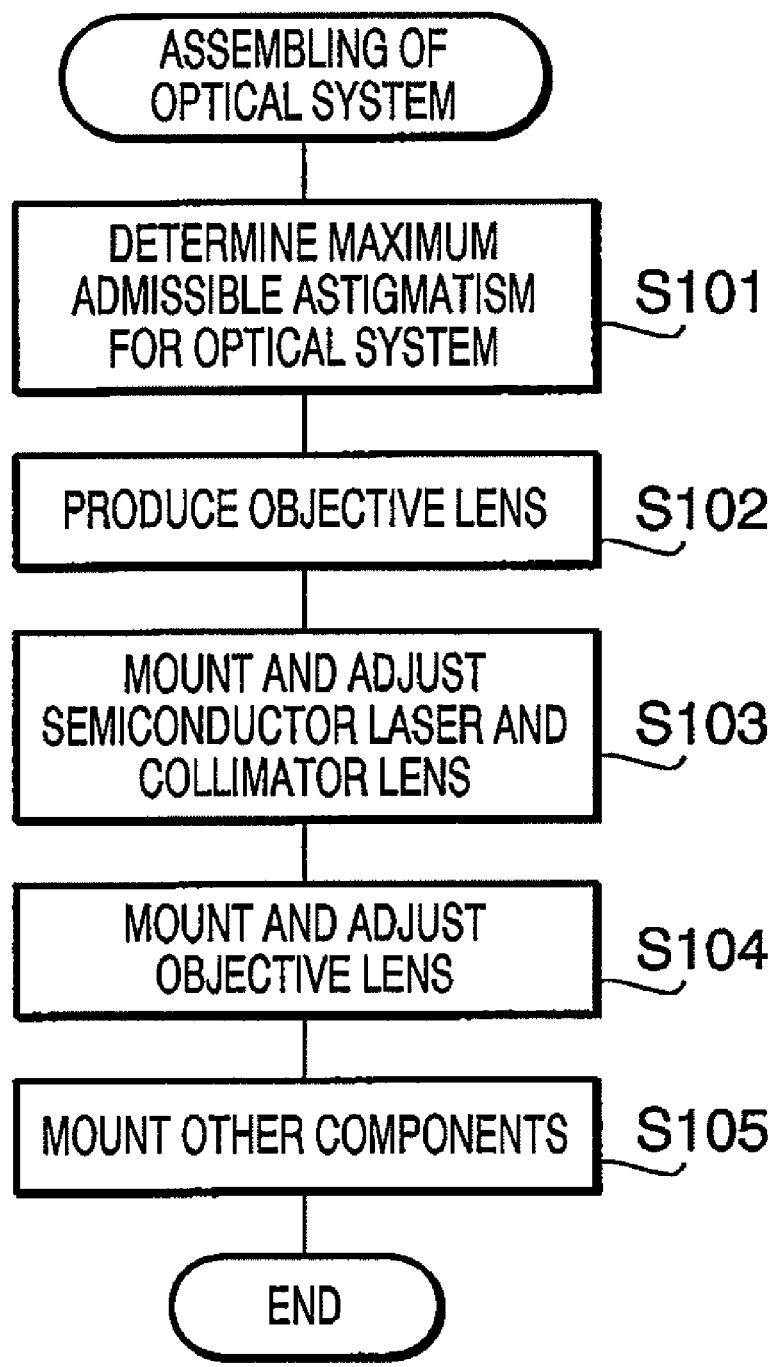
FIG. 4 is a flowchart illustrating the assembling method of the optical system.

Hereafter, the assembling method of the optical system 10 is described. FIG. 2 is an explanatory illustration explaining the assembling method according to the embodiment. FIG. 4 is a flowchart illustrating the assembling method for the optical system 10.

First, a manufacturer determines a maximum admissible astigmatism to be applied to the entire optical system 10 (step S101). Hereafter, the maximum admissible astigmatism is denoted by a variable "A". "A" is represented in the unit of λrms (root-mean-square) and is not zero.

Next, objective lenses (14) are produced (step S102). For producing of the objective lenses 14, the manufacturer assigns 2A (i.e., a two-fold value of the maximum admissible astigmatism for the entire optical system 10) to a maximum admissible astigmatism for the objective lens 14. Therefore, in the production of objective lenses 14, objective lenses having the amount of astigmatism larger than 2A are rejected as defective products, and objective lenses having the amount of astigmatism smaller than or equal to 2A are regarded as non-defective products.

Next, an assembling process for the semiconductor laser 11 and the collimator lens 13 is conducted (step S103). In this process, a worker prepares the semiconductor laser 11 and the collimator lens 13, and mounts the semiconductor laser 11 and the collimator lens 13 on the body case (not show) of the optical pick-up. More specifically, the worker mounts the semiconductor laser 11 and the collimator lens 13 on the body case of the optical pick-up such that the point source of the semiconductor laser 11 is positioned on an optical axis of the collimator lens 13.

Furthermore, the worker tilts the collimator lens 13 with respect to the center of the collimator lens 13 by a required angle (see an arrow (a) in FIG. 2) so that a front side optical system defined from the semiconductor laser 13 to the collimator lens 13 in the optical system 10 has the amount of astigmatism of "A".

Next, an assembling process of the objective lens 14 for mounting the objective lens 14 on the body case of the optical system 10 is conducted (step S104). In this process, the worker mounts the objective lens 14 on the body case such that the point source of the semiconductor laser 11 and the center of the collimator lens 13 are positioned on an optical axis of the objective lens 14.

Furthermore, the worker rotates the objective lens 14 about the optical axis of the objective lens 14 (see an arrow (b) in FIG. 2) so that the total amount of astigmatism of the optical system 10 including the semiconductor laser 12, the collimator lens 13 and the objective lens 14 becomes smaller than or equal to "A".

Finally, the worker completes the assembling of the optical system 10 by mounting the half mirror 12 and the photoreceptor 15 on the body case of the optical pick-up (step S105).

The reason why the total amount of astigmatism of the entire optical system 10 can be suppressed to a level lower than or equal to "A" regardless of the fact that the objective lens 14 of which maximum admissible astigmatism is "2A" is employed in the optical system 10 will now be explained with reference to FIG. 3. FIG. 3 is a table showing a relationship between the astigmatism of the front side optical system (defined from the semiconductor laser 12 to the collimator lens 13), the astigmatism of the objective lens 14, and the total astigmatism of the entire optical system 10.

As shown in FIG. 3, the total amount of astigmatism of the entire optical system 10 is equal to a value obtained by maximally canceling the amount of astigmatism of the front side optical system with the amount of astigmatism of the objective lens 14. The reason is explained as follows.

An astigmatism has directionality that an image formation point by power in a certain direction (e.g., a meridional direction) is different, along the optical axis, from an image formation point by power in a direction (e.g., a sagittal direction) perpendicular to the certain direction. This means that, in an optical system having two lenses, an astigmatism of a certain lens can be cancelled with an astigmatism of another lens. In particular, when two lenses are rotated with respect to each other by 90 degrees from the condition where a direction of astigmatism of one lens coincides with a direction of astigmatism of another lens, the astigmatisms of the two lenses can be maximally cancelled each other. By thus canceling the astigmatism of the two lenses, the astigmatism of the entire optical system including the two lenses decreases, and thereby the wavefront aberration (λrms) of an actual wavefront with respect an ideal wavefront also decreases.

As shown in FIG. 3, regarding the case where the amount of astigmatism of the front side optical system is zero, the total amount of astigmatism of the optical system 10 is also zero when the amount of astigmatism of the objective lens 14 is zero, and the total amount of astigmatism of the optical system 10 is "A" when the amount of astigmatism of the objective lens 14 is "A".

Regarding the case where the amount of astigmatism of the front side optical system is "A", the total amount of astigmatism of the optical system 10 can be suppressed within a range from zero through "A" when the amount of astigmatism of the objective lens 14 is from zero through "A".

Furthermore, regarding the case where the amount of astigmatism of the front side optical system is "A", the total amount of astigmatism of the optical system 10 can be suppressed to a range from zero through "A" even when the amount of astigmatism of the objective lens 14 lies in a range from "A" through "2A". That is because the amount of astigmatism of the front side optical system can be cancelled with the amount of astigmatism of the objective lens 14. This means that the total amount of astigmatism of the entire optical system 10 can be suppressed to a level smaller than or equal to "A" as long as the amount of astigmatism of the objective lens 14 is smaller than or equal to "2A".

As described above, the manufacturer of the optical system 10 is allowed to employ the maximum admissible astigmatism of up to "2A" for the objective lens 14 by designing the front side optical system in the optical system to be adjustable to have the amount of astigmatism equal to the maximum admissible astigmatism defined for the entire optical system.

In this embodiment, the wavelength of the light beam emitted by the semiconductor laser 11 is, for example, shorter than or equal to 450 nm. The image side numerical aperture of the objective lens 14 is, for example, larger than or equal to 0.65.

In an example, the maximum admissible astigmatism for the entire optical system 10 lies within a range from 0.005 to 0.030 λrms. The maximum admissible astigmatism for the entire optical system 10 may lie within a range from 0.005 to 0.015 λrms.

Although the present invention has been described in considerable detail with reference to certain preferred embodiments thereof, other embodiments are possible.

This application claims priority of Japanese Patent Application No. P2007-125895, filed on May 10, 2007. The entire subject matter of the application is incorporated herein by reference.

What is claimed is:

1. An assembling method for an optical system of an optical pick-up including a semiconductor laser, a collimator lens and an objective lens, the method comprising:
defining a maximum admissible astigmatism for the entire optical system;
installing, on a rear side of the semiconductor laser, the collimator lens on a body case of the optical system to cause a predetermined amount of astigmatism lying within a range of up to the maximum admissible astigmatism for the entire optical system by tilting the collimator lens with respect to a center of the collimator lens from a condition where a point source of the semiconductor laser lies on an optical axis of the collimator lens; and
installing, on a rear side of the collimator lens, the objective lens on the body case of the optical system to bring a total amount of astigmatism of the entire optical system to a level smaller than or equal to the maximum admissible astigmatism for the entire optical system by rotating the objective lens about an optical axis of the objective lens under a condition where the point source of the semiconductor laser and the center of the collimator lens lie on the optical axis of the objective lens.

2. The assembling method according to claim 1, wherein the predetermined amount of astigmatism caused by tilting the collimator lens is equal to the maximum admissible astigmatism for the entire optical system.

3. The assembling method according to claim 1, wherein the maximum admissible astigmatism for the entire optical system lies within a range from 0.005 to 0.030 λrms.

4. The assembling method according to claim 3, wherein the maximum admissible astigmatism for the entire optical system lies within a range from 0.005 to 0.015 λrms.

5. The assembling method according to claim 1, wherein:
a wavelength of a beam of the semiconductor laser is shorter than or equal to 450 nm; and
a numerical aperture defined for the objective lens on a image side is larger than or equal to 0.65.

6. The assembly method according to claim 1, wherein the objective lens has a maximum admissible astigmatism of up to about twice the maximum admissible astigmatism of the entire lens system.

7. The assembly method according to claim 1, wherein the tilting of the collimator lens comprises tilting the collimator lens by an angle such that the astigmatism of the semiconductor laser and the collimator lens is equal to the maximum admissible astigmatism of the entire optical system.

8. The assembly method according to claim 1, wherein the tilting of the collimator lens and the rotating of the objective lens comprises tilting the collimator lens and rotating the objective lens by amounts such that the astigmatism of the collimator lens at least partially cancels the astigmatism of the objective lens.

9. The assembly method according to claim 1, wherein the tilting of the collimator lens is such that the collimator lens is oriented out of a plane perpendicular to the optical axis of a beam emitted from the semiconductor laser.

10. A method for assembling an optical system of an optical pickup, the optical system including a semiconductor laser, a collimator lens, and an objective lens, the method comprising:
defining a maximum admissible astigmatism for the entire optical system;
installing, on a light beam emission side of the semiconductor laser, the collimator lens so as to cause a predetermined amount of astigmatism, within a range of up to the maximum admissible astigmatism of the entire optical system, by tilting the collimator lens about a center of the collimator lens from a position where a point source of the semiconductor laser lies along an optical axis of the collimator lens; and
installing, on the light beam emission side of the semiconductor laser, the objective lens and rotating the objective lens about an optical axis of the objective lens so as to bring a total amount of astigmatism of the entire optical system to a level equal to or less than the maximum admissible astigmatism for the entire optical system.

11. The method for assembling according to claim 10, wherein the predetermined amount of astigmatism caused by tilting of the collimator lens is equal to the maximum admissible astigmatism for the entire optical system.

12. The method for assembling according to claim 10, wherein
the maximum admissible astigmatism for the entire optical system lies within a range of from 0.005 to 0.030 λrms.

13. The method of assembling according to claim 12, wherein
the maximum admissible astigmatism for the entire optical system lies within a range of from 0.005 to 0.015 λrms.

14. The method of assembling according to claim 10, wherein a wavelength of a light beam emitted by the semiconductor laser is equal to or less than 450 nm and a numerical aperture defined for the objective lens on an image side is equal to or larger than 0.65.

15. The assembly method according to claim 10, wherein the objective lens has a maximum admissible astigmatism of up to about twice the maximum admissible astigmatism of the entire lens system.

16. The assembly method according to claim 10, wherein the tilting of the collimator lens comprises tilting the collimator lens by an angle such that the astigmatism of the semiconductor laser and the collimator lens is equal to the maximum admissible astigmatism of the entire optical system.

17. The assembly method according to claim 10, wherein the tilting of the collimator lens and the rotating of the objective lens comprises tilting the collimator lens and rotating the objective lens by amounts such that the astigmatism of the collimator lens at least partially cancels the astigmatism of the objective lens.

18. The assembly method according to claim 10, wherein the tilting of the collimator lens is such that the collimator lens is oriented out of a plane perpendicular to the optical axis of a beam emitted from the semiconductor laser.

\* \* \* \* \*